United States Patent
Jacob

(10) Patent No.: US 10,410,143 B2
(45) Date of Patent: Sep. 10, 2019

(54) RESERVATION EXCHANGE SERVER SYSTEM

(71) Applicant: Hotel Trader LLC, Gillette, NJ (US)

(72) Inventor: Kurien Jacob, New York, NY (US)

(73) Assignee: HOTEL TRADER, LLC, Gillette, NJ (US)

(*) Notice: Subject to any disclaimer, the term of this patent is extended or adjusted under 35 U.S.C. 154(b) by 438 days.

(21) Appl. No.: 14/749,223

(22) Filed: Jun. 24, 2015

(65) Prior Publication Data

US 2015/0371156 A1 Dec. 24, 2015

Related U.S. Application Data

(60) Provisional application No. 62/016,293, filed on Jun. 24, 2014.

(51) Int. Cl.
*G06Q 10/02* (2012.01)
*G06Q 50/12* (2012.01)
(Continued)

(52) U.S. Cl.
CPC .............. *G06Q 10/02* (2013.01); *G06Q 10/08* (2013.01); *G06Q 30/08* (2013.01); *G06Q 50/12* (2013.01); *G06Q 50/14* (2013.01)

(58) Field of Classification Search
CPC ........ G06Q 10/02; G06Q 10/08; G06Q 30/08; G06Q 50/12; G06Q 50/14
See application file for complete search history.

(56) References Cited

U.S. PATENT DOCUMENTS

| | | | | |
|---|---|---|---|---|
| 5,819,092 A | * | 10/1998 | Ferguson | G06F 17/30014 705/39 |
| 6,134,534 A | * | 10/2000 | Walker | G06Q 10/02 705/37 |

(Continued)

FOREIGN PATENT DOCUMENTS

| | | |
|---|---|---|
| EP | 3161737 | 5/2017 |
| JP | 2002-109337 | 4/2002 |
| WO | 2015200498 | 12/2015 |

OTHER PUBLICATIONS

Zhang, Xinyan. "An investigation into the vertical coordination in tourism supply chains through buyback policy." Proceedings of the 6th CIRP-Sponsored International Conference on Digital Enterprise Technology. Springer, Berlin, Heidelberg, 2010. (Abstract Only) 3p.*

(Continued)

*Primary Examiner* — Asfand M Sheikh
(74) *Attorney, Agent, or Firm* — Greenberg Traurig, LLP

(57) ABSTRACT

Embodiments of the invention include a system for managing inventory transactions within an online marketplace including a reservation server to mediate inventory exchange from a buyer to a seller via an online network. The reservation server includes a memory and a processor coupled to the online network. The memory includes computer-executable instructions that when executed by the processor, establishes a sales channel between the seller and buyer. The sales channel includes a direct sales channel, an indirect sales channel, and resale channel. The online network includes a marketplace server including an inventory that can be reserved, sold, or resold through the sales channel mediated by the reservation server based on the reservation server receiving an inventory reservation request from the seller or buyer. Further, the inventory includes a set (Continued)

price, and the buyer can purchase, repurchase, reserve, option, or swap at least one inventory.

25 Claims, 7 Drawing Sheets

(51) Int. Cl.
    *G06Q 30/08*     (2012.01)
    *G06Q 10/08*     (2012.01)
    *G06Q 50/14*     (2012.01)

(56) References Cited

U.S. PATENT DOCUMENTS

| | | | |
|---|---|---|---|
| 6,658,390 B1* | 12/2003 | Walker | G06Q 10/02 705/15 |
| 7,328,166 B1* | 2/2008 | Geoghegan | G06Q 10/02 705/5 |
| 7,849,133 B2* | 12/2010 | Denker | H04L 63/105 709/203 |
| 8,301,491 B2 | 10/2012 | Bapna et al. | |
| 8,355,973 B2 | 1/2013 | Geller et al. | |
| 8,401,923 B1* | 3/2013 | Lester | G06Q 30/08 705/26.41 |
| 9,547,878 B1* | 1/2017 | Kerr | G06Q 50/12 |
| 2003/0083979 A1* | 5/2003 | Walker | G06Q 20/00 705/37 |
| 2003/0216973 A1* | 11/2003 | Walker | G06Q 10/02 705/5 |
| 2004/0034537 A1* | 2/2004 | Gengarella | G06Q 10/02 705/5 |
| 2004/0103025 A1* | 5/2004 | Ulf | G06Q 10/02 705/14.1 |
| 2004/0267567 A1* | 12/2004 | Barrera | G06Q 10/02 705/2 |
| 2005/0160026 A1* | 7/2005 | Seidman | G06Q 30/00 705/37 |
| 2007/0075136 A1* | 4/2007 | Jacob | G06Q 10/02 235/383 |
| 2008/0228532 A1* | 9/2008 | Gengarella | G06Q 10/02 705/5 |
| 2009/0234710 A1* | 9/2009 | Belgaied Hassine | G06Q 30/02 705/7.29 |
| 2009/0254489 A1 | 10/2009 | Geller et al. | |
| 2009/0287596 A1* | 11/2009 | Torrenegra | G06Q 30/06 705/37 |
| 2009/0307019 A1* | 12/2009 | Grussu | G06Q 10/02 705/5 |
| 2009/0319389 A1 | 12/2009 | Bapna et al. | |
| 2010/0049556 A1* | 2/2010 | Liu | G06F 17/30867 705/5 |
| 2013/0006712 A1* | 1/2013 | Behlouli | G06Q 30/02 705/7.35 |
| 2013/0246242 A1 | 9/2013 | Geller et al. | |
| 2013/0339193 A1* | 12/2013 | Ricci | G06Q 10/087 705/26.81 |
| 2014/0222473 A1* | 8/2014 | Patel | G06Q 30/08 705/5 |
| 2016/0335563 A1* | 11/2016 | Seidman | G06Q 10/02 |

OTHER PUBLICATIONS

Korean Intellectual Property Office; PCT International Search Report, issued in connection to PCT/US2015/037452; dated Oct. 26, 2015; 3 pages; Korea.

Korean Intellectual Property Office; PCT Written Opinion of the International Searching Authority, issued in connection to PCT/US2015/037452; dated Oct. 26, 2015; 6 pages; Korea.

Korean Intellectual Property Office; PCT International Preliminary Report on Patentability, issued in connection to PCT/US2015/037452; dated Dec. 27, 2016; 7 pages; Korea.

European Patent Office; Extended European Search Report, issued in connection to EP15811004.9; dated Oct. 27, 2017; 4 pages; Europe.

European Patent Office; Supplementary European Search Report, issued in connection to EP15811004.9; dated Nov. 14, 2017; 2 pages; Europe.

\* cited by examiner

RESERVATION EXCHANGE SERVER SYSTEM

RELATED APPLICATIONS

This application claims priority from U.S. Provisional Application No. 62/016,293, filed on Jun. 24, 2014, the entire contents of which are incorporated herein by reference.

BACKGROUND

Today, most product offerings or "inventory" are sold to customers by the providers of these offerings (such as hotels, car rentals companies, airlines, cruise ships, restaurants, golf clubs, etc.) using a one way transaction model. The reservations or purchases flow in one direction, moving from the merchant or service provider to the consumer, either directly or indirectly. This model can include, for example, direct to the customer methods, such as from travel agents who sell to customers, from wholesalers who sell to the travel agents and on to customers, from corporate entities for their employees' travel, and from group operators coordinating events with multiple inventory needs, and so on.

In the realm of business or leisure travel, the two primary types of reservations include refundable and non-refundable reservations. Refundable reservations may be cancelled prior to the reserved date of service or a specifies set time prior to the reserved date with no penalties incurred as long as cancellation occurs before a communicated penalty date and time. The service is either paid for at time of reservation, with the ability to obtain a refund minus any applicable fees if cancelled prior to penalty, or paid for at the time of service. Non-refundable reservations are paid for at time of reservation, and are not eligible to be cancelled. In all cases, the customer either reserves the right to use the service for some future point in time, or prepays for the service that will be consumed in the future.

Many service providers have limited inventory or availability for future time periods. For example, a hotel may have a finite supply of rooms within a hotel building, an airline may have limited seats on an aircraft or within a set fare range, a restaurant will have seating and capacity limitations, a golf club may have set tee times and rules governing the number of players on a course, and so on. The value of the inventory is determined at the time of transaction, and the agreed value is held through the execution of the reservation. The final transaction ends with the customer using the service that they purchased, or reserved for use, and consuming it on the intended date or within a predetermined period of time as agreed by the consumer during the purchase transaction. With most reservations or purchases flowing in one direction (moving directly or indirectly from the merchant or service provider to the consumer) there can be a disparity in inventory between various sales channels, and as a result, an imbalance can exist between demand and supply across these sales channels. Although the service provider or merchant can control the inventory and determine how the inventory is sold, today's reservation and purchase exchange systems generally do not enable interaction between new customers and customers with existing reservations or purchases to allow consumers to buy and sell the inventory from any other party.

Within the hotel industry, demand is very fragmented causing a sub-optimal profitability due to deep discounts and a limited view into future demand. Many hotels and destinations have varying demand caused by events, holidays, conferences, conventions. In periods of high demand there is a cap on revenue as hotels have a fixed inventory and cannot manufacture more rooms for the higher demand. Hotels are comprised of different types of traveler segments including leisure, business, corporate groups, leisure groups. Every segment experiences different booking behaviors and price points. International leisure guests tend to book earlier than domestic leisure guests who book earlier than business travelers. Channels that have emerged over the last decade have been costly for hotels with a high margin cost and eroding average rates.

SUMMARY

Embodiments of the invention include a system for managing inventory transactions within an online marketplace comprising a reservation server configured and arranged to mediate inventory exchange from at least one buyer to at least one seller via at least one online network. The reservation server comprises at least one memory and at least one processor coupled to the online network, and the memory includes computer-executable instructions that when executed by the at least one processor, establishes at least one sales channel between the at least one seller and the at least one buyer. Further, the at least one sales channel includes at least one direct sales channel, at least one indirect sales channel, and at least one resale channel. Further, the at least one online network comprises at least one marketplace server comprising at least one inventory that can be reserved, sold, or resold through the at least one sales channel mediated by the reservation server based at least in part on the reservation server receiving at least one inventory reservation request from the at least one seller or the at least one buyer. Further, the at least one inventory comprises a set price from the at least one seller or the at least one buyer.

In some embodiments, the at least one seller or buyer comprises a service provider or supplier coupled to the online marketplace via the online network. In some other embodiments, the at least one sales channel comprises a bidirectional sales channel configured to enable a transfer of the at least one inventory from the at least one seller and the at least one buyer and from the at least one buyer to the at least one seller.

In some embodiments, the reservation server is configured and arranged to enable at least one buyer to reserve the right to purchase at least one inventory at a future date for a specified amount. In some further embodiments, the reservation server is configured and arranged to enable at least one buyer to at least partially pre-pay for at least one inventory.

In some embodiments of the invention, the inventory comprises at least one inventory comprises at least one of an accommodation reservation, a food or food service reservation, a cruise reservation, a flight reservation, a golf tee time reservation, a sports event reservation, a concert reservation, and a rental vehicle reservation.

In some embodiments, the at least one inventory is sourced from the online marketplace by the at least one buyer through a plurality of sales channels including the at least one direct sales channel and the at least one indirect sales channel and the at least one resale channel.

In some embodiments of the invention, the at least one online network includes at least one buyer, and the at least one inventory was previously reserved or sold through the reservation server by at least one other buyer. In some embodiments, the reservation server is configured and arranged to sell the at least one inventory with a lowest set price.

In some embodiments, the reservation server is configured and arranged to receive at least one bid through the at least one online network for at least one inventory from at least one buyer and direct the at least one bid through at least one sales channel within the at least one online network to at least one seller.

In some embodiments, the at least one seller comprises an individual communicatively coupled to the at least one online network. In some embodiments, the at least one seller comprises the at least one marketplace server.

In some embodiments, the reservation server is configured and arranged to enable at least one inventory transaction from the at least one marketplace server when the at least one bid is different than the at least one sellers set price. In some further embodiments, the reservation server is configured and arranged to enable an inventory transaction from the at least one marketplace server when the at least one bid is lower than the at least one sellers set price.

In some embodiments, the reservation server is configured and arranged to enable an inventory transaction from the at least one marketplace server when the at least one bid is lower than the current intrinsic market value of the at least one inventory at the time of sale. In some further embodiments, the reservation server is further configured and arranged to enable the at least one buyer to exercise the bid for at least one current or future inventory transaction. Some embodiments include a system where the reservation server is configured and arranged to accept at least one bid from at least one buyer when there is no inventory available.

In some embodiments, the reservation server is configured and arranged to enable the at least one buyer or the at least one seller to specify the at least one sales channel as the at least one direct sales channel, the at least one indirect sales channel, or the at least one resale channel.

In some embodiments, the at least one seller comprises a service provider or supplier coupled to the online marketplace via the online network. In some further embodiments, the at least one seller comprises another buyer coupled to the online marketplace via the online network.

In some embodiments of the invention, the reservation server is configured and arranged to manage a repurchase or swap of at least one inventory between at least one seller and at least one buyer, the management including configuring ownership change, collecting a resale price or swap difference price between swapped inventory, and distributing proceeds to the at least one buyer for a repurchase or swap of at least one inventory.

In some embodiments, the reservation server is configured and arranged to specify the at least one sales channel as the at least one direct sales channel, the at least one indirect sales channel, or the at least one resale channel based on a price of the at least one inventory, where the price of the at least one inventory comprises at least one of an intrinsic market value at the time of sale, a lowest price calculated by the reservation server based on prices received by the reservation server through the at least one sales channel, a sellers set price, and a buyers bid price.

In some embodiments, the reservation server is configured and arranged to enable the at least one buyer to pause or freeze at least one price for the at least one inventory for a specified period of time, the at least one price calculated by the reservation server based at least in part on the period of time.

In some further embodiments, the reservation server is configured and arranged to enable the at least one buyer to purchase at least one option to purchase for at least one pre-determined price for the at least one inventory for a lock period. Further, prior to expiration of the lock period, the at least one buyer can purchase the at least one reservation for the at least one pre-determined price. Further, the reservation server is configured and arranged to sell unused options through the online marketplace.

In some embodiments, the reservation server is configured and arranged to actively solicit for and purchase at least one inventory through the online marketplace via the at least one online network. In some other embodiments, the at least one inventory can be sourced from more than one seller, and the reservation server is configured and arranged to enable the buyer to purchase the at least one inventory from one or more sellers based on a final price calculated by the reservation server from one or more prices received from the one or more sellers.

DETAILED DESCRIPTION

Figure 1:
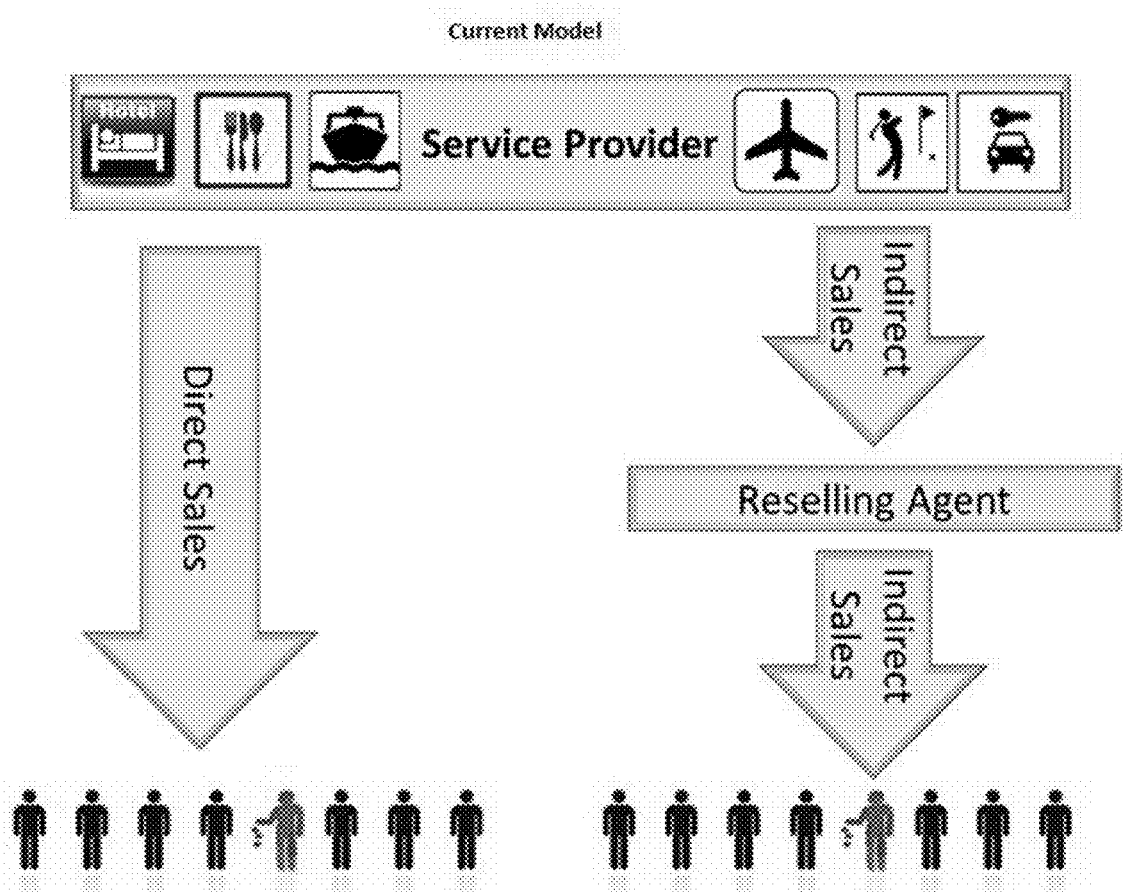
FIG. 1 provides an illustration of a prior art exchange system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Currently, customers can reserve or prepay for one or more products and/or services such as a reservation of a service or product and/or or a merchandise purchases (hereinafter referred as "inventory") through one or more individual direct retail purchases. Typically, the purchase is transparent, where the name of the service provider and/or the rate is known to the customer 10 at time of selection and/or purchase. Alternatively, in some instances, the customer 10 can bid for a reservation or product in an opaque structure. For example, in the case of a travel reservation involving a hotel, either the hotel name or the rate, or sometimes both, are unknown.

FIG. 1 provides an illustration of a conventional exchange system that is used by customers to review, select, and purchase inventory. As illustrated, within the current model, one or more service providers can be accessed by a consumer interested in reviewing and potentially reserving and/or purchasing inventory. For instance, this can include hotels with a finite supply of rooms, and/or a restaurant or restaurant chain with a selection of restaurants including dining seating available on certain dates and times. Other examples include a cruise line operator with a selection of cruise dates and times, and/or an airline with a selection of flight destinations and available flights and fares. Some further examples include a golf club with tee times across one or more golf courses, or a rental car company with a selection of rental cars that can be booked by rental car location, date and time. Usually, the inventory can be sold directly to the consumer, or can be sold to a reselling agent and subsequently onto a consumer (via the reselling agent) through an indirect sales process.

Figure 2A:
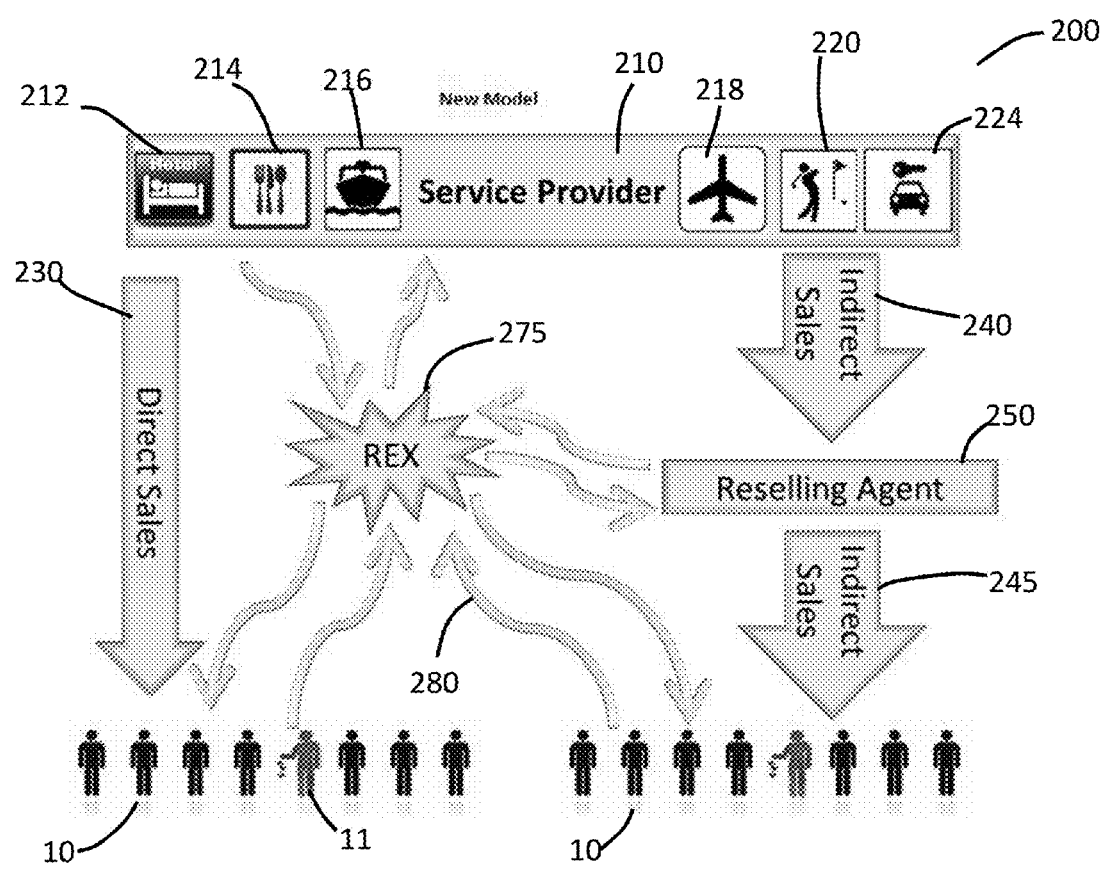
FIG. 2A provides an illustration of a reservations system and method in accordance with at least one embodiment of the invention.

In some embodiments of the invention, reservations or purchases of inventory can move in multiple directions. For example, FIG. 2A provides an illustration of a reservation system and method 200 in accordance with at least one embodiment of the invention. In this instance, the reservation system and method 200 can allow reservations or purchases of inventory to move in more than one direction (e.g., in a forward direction and a reverse direction and from a seller to at least one buyer and from at least one buyer to at least one other buyer or seller). In some embodiments, the flow direction and/or flow volume (the volume or sales during any time period) can be determined by demand and supply for various sales channels including indirect and direct sales.

For example, in some embodiments, reservation system and method 200 can comprise at least one purveyor of goods or services (shown as service provider 210). The reservation system and method 200 is not intended to be limited by a single service provider 210, and can include multiple providers of services capable of providing one or more goods or services to a current or future customer 10. For example, in some embodiments, the reservation system and method 200 can include a service provider 210 comprising a hospitality and/or accommodation provider 212 such a hotel, motel, hostel, and/or bed and breakfast, hostel, or other accommodation with a finite supply of room that can be used for rest and/or sleeping. In some further embodiments, the reservation system and method 200 can include a service provider 210 comprising a food or food service purveyor including, but not limited to a restaurant that provides dining seating available on certain dates and times, a restaurant that does not allow reservations, and/or a restaurant or food-outlet order and delivery service. In some further embodiments, the reservation system and method 200 can include a service provider 210 comprising a cruise line operator with a selection of cruise dates and times. For example, in some embodiments, the service provider 210 can comprise an ocean cruise line service provider. In some other embodiments, the service provider 210 can comprise a river cruise service provider. In some further embodiments, the service provider 210 can comprise boating or shipping service provider. In some embodiments, the service provider 210 can comprise an airline with a selection of flight destinations and available flights and fares. In some further embodiments, the service provider 210 can comprise a charter flight company. In some other embodiments, the service provider 210 can comprise a private jet service. In some embodiments of the invention, the service provider can comprise a golf club, golf course, putting service or club, and/or golf practice club or service. In some other embodiments, the service provider 210 can comprise any service provider providing a sport game or entertainment product or service. In some further embodiments of the invention, the service provider 210 can comprise a vehicle rental company. For example, in some embodiments, the service provider 210 can comprise a car rental company with a selection of rental cars that can be booked by rental car location, date and time. In other embodiments, the service provider 210 can comprise a light-duty, medium-duty, and/or heavy-duty truck rental company or service, with a selection of trucks that can be booked by rental car location, date and time.

In some instance, the service provider 210 can sell at least one product or service directly to one or more customers 10 (e.g., through a direct sales channel 230). In other embodiments, the service provider 210 can sell at least one product or service indirectly to one or more customers 10 (e.g., through channel 280). For example, in some embodiments, one or more customers 10 can interface with a reservation system 275 to search for, review, and purchase and/or reserve at least one service or product. In some embodiments, one or more transactions between one or more customers 10 and one or more service providers 210 can occur in multiple directions. For example, as shown by the transaction channels 280, in some embodiments, reservations or purchases do not have a singular direction, and any specific transaction can flow in a reverse direction from the last transaction.

In some embodiments, the reservations system and method 200 can allow interaction between new customers 10 and customers 10 with existing reservations (e.g., such as customer 11). Further, some embodiments of the invention can include a reservations system and method 200 that can enable transactions to flow through multiple sales channels and with the service provider 210 to buy and sell the inventory from other parties (e.g., a new customer 10, a previous or existing customer 10, and/or another merchant, provider or supplier).

In some embodiments, one or more customers 10 can buy directly from the reservations system 275. For example, in some embodiments, the inventory that is sold to customers 10 can be sourced directly from the service provider 210, sourced from multiple sales channels (such as any of the service providers 212, 214, 216, 218, 220, 224, a reselling agent 250, or sourced from customers 10 who have previously purchased, reserved, or hold an option for inventory, such as customer 11). In this instance, the end customer is a retail customer.

In some further embodiments, one or more sales channels can buy directly from the reservation system 275. For example, in some embodiments, the inventory that is sold to the sales channel can come directly from the service provider, from other sales channels, or from other customers who have previously purchased or reserved inventory. In this instance, the sales channel is the customer 10.

In some other embodiments, service providers can buy directly from the reservation system 275. In this instance, the inventory that is sold to the service provider can come directly from the other sales channels, or from customers who have previously purchased or reserved inventory. In this instance, the service provider 210 is the customer 10.

In addition to the above mentioned reservation-based transactions, some embodiments of the invention can include the reservation system and method 200 enabling and coordinating reselling of products such as tickets, clothes, or any other exchange of ownership of a purchased tangible item. In some embodiments, the reservation system and method 200 can facilitate the sale of the reservation to other customers 10. In some further embodiments, the reservation system and method 200 can allow the original service provider 210 and/or other sales channels to perform a transaction to a customer 10 and/or to another merchant and/or sales channel 230, 240, 245, 280. In this instance, the reservation system and method 200 can exchange a reservation which is the promise to pay for a service that will be rendered at some point in the future. It is essentially a right to exercise an option on a particular service at some point in the future, rather than the purchase of a tangible product. In some embodiments, this method allows for a refundable reservation or a fully paid reservation to be traded.

Some embodiments of the invention include a reservation system and method 200 that allows the service provider 210, and/or the sales channels 230, 240, 250, 245, and/or the prospective customer 10, and/or the customer 11 with existing reservations, service, or products, and/or any other individual or entity to sell or buy inventory. In this instance, the reservation system and method 200 can allow each user to set a price for the sale of the inventory they hold for which the reservation system 275 will offer to all others. In some embodiments, the reservations system and method 200 can always sell the lowest priced reservation first (assuming it is the exact product including dates and terms).

Some embodiments of the invention include a reservations system and method 200 that can enable users (including retail consumers, merchants and service providers, and reselling agents) to bid on a reservation at a price below the price offered by any other points of sale. In this instance, the reservations system and method 200 can allow for a transaction to take place at a different price from the visible retail price offered. Further, in some embodiments, if one user (e.g., such as a customer 10) accepts the bid of another user for a unit of inventory, the bidder can have the right to exercise the bid at some point in the future. In this example, the transaction can comprise a hybrid between a transparent retail transaction and an opaque pricing model within the reservations system and method 200. Moreover, this method allows for transactions to take place substantially instantly at a known service provider 210 based on the buyer accepting the seller's listed price. In some embodiments, if the buyer does not accept the price set by the seller, the buyer can make an offer. In some embodiments, the offer can be sent to all the holders of that specific service offering. In some embodiments, if the offer is accepted by any of the inventory holders, the reservations system and method 200 can enable the transaction to take place. It is important to note here that anyone can accept the offer from a buyer including the service provider who originally sold the reservation either directly or indirectly. For example, this can occur if they feel that they need the reservation as they could potentially be overbooked for the service or decide to sell the service to another customer at a profit. The offer could also be accepted by an indirect sales channel that may decide to add further inventory, and may try to sell this within the time from purchase to the service date at a profit.

Some further embodiments of the invention include a reservations system and method 200 that can allow customers, and/or services providers, and/or resellers of services to buy and sell perishable services from each other through multiple sales opportunities. In some embodiments, the transactions can occur by sending and/or receiving offers within the reservation system 275. In some embodiments, this can be applicable across any service sector, such as, but not limited to, hotels, vacation rentals, airlines, car rentals, cruises, car sharing, restaurants (e.g., for dinner reservations), spas, golf courses (e.g., such as golf tee times), buses, coaches, taxi services, limousine transportation services, trains, light-rail services, etc. Some other sectors that can be managed and used to perform a transaction of this type can include movie ticket reservations, theater ticket reservations, sports events seating, and music and concert seating reservations.

In some embodiments of the invention, prior to or during any transaction, the market value of the inventory can change. For example, in some embodiments, the market value of the inventory can rise. In some other embodiments, the market value of the inventory can fall. In some further embodiments, the market value of the inventory can remain substantially static. In some embodiments, the market value of the inventory can either rise or fall from the time of reservation to the time of consumption of the inventory reserved.

In some embodiments of the invention, when demand for inventory rises, the value of the inventory can rise above the value during a prior transaction of the inventory. In this instance, the reservation or purchase holder can be provided with an option to obtain the service or product at a reserved rate which is lower than the current market rate. In some instances, the service provider or merchant may also have sold out of inventory, or have low inventory levels for any particular period where demand is high. In some embodiments, the reservation system and method 200 can be configured to create a free flow of reservations of perishable and non-perishable inventory based on supply and demand.

In some embodiments, any price provided by the reservations system and method 200 can be market based, and can be influenced and/or set based on a supply and demand ratio at the various points of sale. In some other embodiments, a user can select a transaction that is independent of the current or past value. In some embodiments, a user can select a transaction route through a specific channel even though the transaction may be available at a lower cost using a transaction recommendation provided by the reservation system and method 200. For example, in some embodiments, a user can select a transaction route directly from a service provider (e.g., such as a direct sales channel 230)

rather than an indirect channel (e.g., a reselling agent 250) even when the cost of the transaction is higher.

In some embodiments of the invention, a user or a customer 10 can make an offer for any service offering or product such as a hotel reservation, golf tee time, care rental, cruise reservation etc. In some embodiments, the offer can be made to the reservation system 275. As described earlier, in some embodiments, the reservation system 275 can be coupled to various suppliers of services such as a hotel, an airline, a car rental company, a cruise ship company or other such service providers. In some embodiments of the invention, the reservation system 275 can couple with resellers of the service (i.e., reselling agents 250). For example, in some embodiments, the reselling agents 250 can be travel agents who sell the hotel to its customers 10, wholesaler operators who contract with the hotel to sell either as a package or independently to travel agents and onto its customers 10. Further, in some embodiments, the reselling agents 250 can be online travel agents who contract with a hotel and sell to their customers 10, or corporate entities contracting with the hotel for their employee travel. Further, the reselling agents 250 can be group operators coordinating events who may contract a set number of rooms for certain dates with the hotel and, reorganize their customers 10 as part of the group.

Figure 2B:
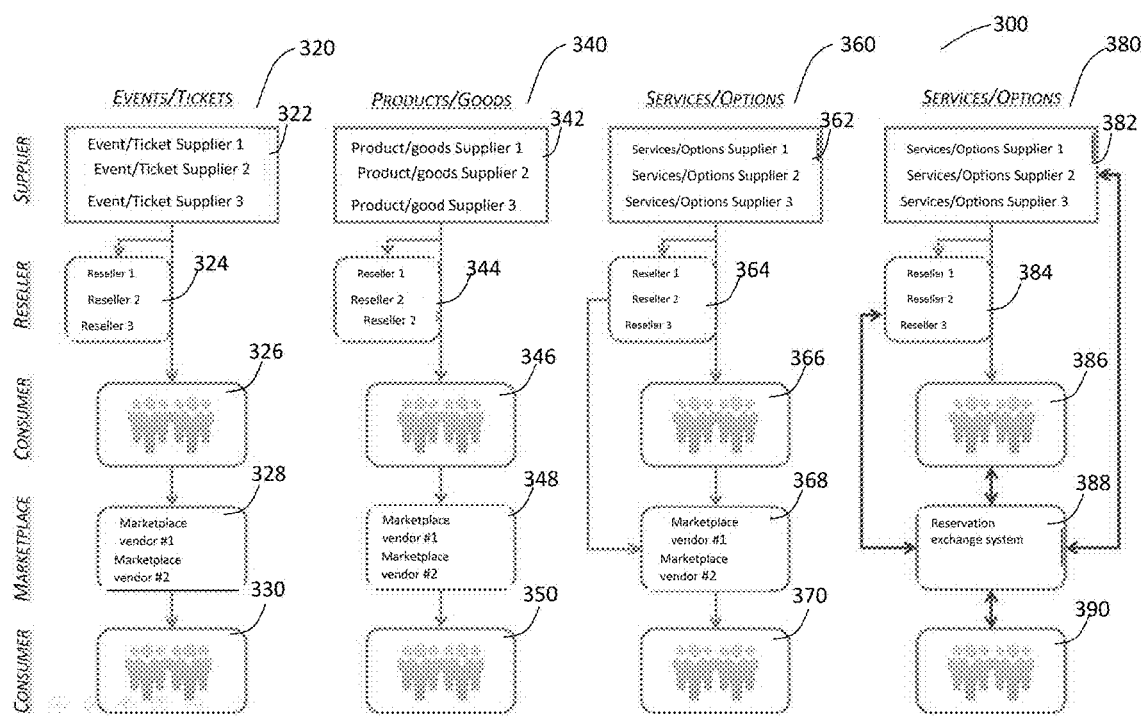
FIG. 2B illustrates transaction flows in accordance with some embodiments of the invention.

FIG. 2B illustrates transaction flows 300 including transaction flows with reselling for various products and services and including the reservations system and method 200. For example, events and/or tickets flow 320 can include event and/or ticket suppliers 322 providing to resellers 324 and/or consumers 326, and a continuance of the transaction flow to market place vendors 328, and on to consumers 330. Similarly, in the case of products and/or goods flow 340, products and/or good suppliers 342 can transact with resellers 344 and/or consumers 346, and a continuance of the transaction flow can occur to market place vendors 348, and on to consumers 350. Similarly, in the case of services and/or options flow 362, services and/or options suppliers 362 can transact with resellers 364 and/or consumers 366, and a continuance of the transaction flow can occur to market place vendors 368, and on to consumers 370.

Some embodiments include services and/or options flow 380 including services and/or options suppliers 382, resellers 384, consumers 386, market place vendors 388, and consumers 390. In some embodiments, services and/or options suppliers 382 can transact with resellers 384 and/or consumers 386, and a continuance of the transaction flow can occur to a reservation exchange system 388, and on to consumers 390. As described earlier, in some embodiments, the reservation exchange system 388 can comprise a computer-implemented reservation system such as the reservation system 275 through which various transactions can be processed. In some embodiments, transactions can be exchanged between resellers 384 and services and/or options suppliers 382, and finally to consumers 390.

In some embodiments of the invention, every entity is a customer 10 and there is no singular customer 10. So each entity that interacts with the reservation system 275 can be a buyer or a seller. Further, any customer 10 can make an offer for a service offering such as a hotel room reservation not necessarily at a listed price by another entity. In some embodiments, since the reservation system 275 receives an inventory comprising a service offering from multiple sources (including any customer 10 that has a confirmed reservation that puts a reservation on sale), the reservation system 275 can always have an up-to-date date availability amongst all reselling agents 250 and the primary supplier of the good or service. Further, in some embodiments, any customer 10 who is not limited to the end customer 10 who will consume the service will be able to make an offer for the reservation, service or product.

Some embodiments of the invention include a reservation system 275 that can facilitate allowing offers to buy a reservation even if there is no availability from any source. For example, in some embodiments, once an offer is received, there will be a communication sent to all the owners of the reservation that meets the buyer's criteria. In some cases, a customer 10 with a confirmed reservation can choose to sell if the price is right. In some instances, the supplier can choose to accept the offer and overbook its service, or can request another customer 10 to move, thereby accommodating the offer received through reservation system 275. In some embodiments, the reservation system 275 can offer function on the premise that there will be a price at which a customer 10 is willing to give up their confirmed reservation for a higher offer. In some embodiments, since reservations are booked at various prices throughout the booking cycle leading to the actual date of consumption of the service, there can be different price levels that will be available to be traded out.

In some further embodiments of the invention, the reservation system 275 can create transactions and more revenue for each service offering even when the service offering is sold out. In some embodiments, the supplier who originally sold the service offering can also be able to buy back the reservation through the reservation system 275. In some instances, when the supplier has overbooked and does not have the capacity to service all the customers for the service on the consumption date, the reservation system 275 can enable the supplier to offer a price and buy back confirmed reservations. In other instances, where the supplier may have sold its service offering at too low a rate or price, the reservation system 275 can enable the supplier to buy back reservations by making an offer through the reservation system 275, and reselling at a higher price to another potential pool of customers 10. This again creates more revenue and transaction value from a single reservation, and can serve to extract a maximum price based on the supply and demand ratio at any given time.

The following steps will typically be involved in the process of making and accepting an offer for a reservation that is traded via the reservations system and method 200 using a reservations system such as reservation system 275. For example, in some embodiments of the invention, a first step, a customer (e.g., such as a customer 10) can pay for a reservation in full or can reserve the right to purchase a service at a future date for a specified amount. In some embodiments, the sale can occur directly from the service provider's direct channel or via any indirect sales channel, which has sourced the inventory from the service provider. Further, within a second step 2, a customer can list the reservation for sale on the reservation system 275 at a specified price. It is important to note that the list price can be lower or higher than the acquisition price. In some embodiments, the reservation can be purchased by any other customer through the reservation system 275, or even repurchased by the service provider (collectively referred to as "secondary buyers"). Alternatively, these secondary buyers can also choose to offer a price lower than the listed price or any other price that is on the reservation system 275 platform. Further, some embodiments include a third step where if any customer makes an offer to buy a reservation for a certain price, the reservation system 275 can serve up that offer to all other customers connected to the system 275, including customers who hold the same reservation criteria, or the original supplier, or the reseller of the supplier. In some embodiments, the customer can receive a consolidated view of all offers that are received on their listing from the reservation system 275. In some embodiments, if a first customer accepts an offer from a second customer who wants to buy the reservation, the reservation can be on the system on which the sale (i.e., the secondary sale) of the reservation to the second customer is completed. In some embodiments, the reservation system 275 can then take the necessary steps to persist the ownership change on the service provider's system, and collect the resale price from second customer, and pay the net proceeds to the first customer. In some embodiments, everyone such as an individual customer, a service provider or a reseller can be a seller or a buyer through the reservation system 275. In some embodiments, the third step can be repeated multiple times as each buyer can also be a seller within the reservation system 275.

In some embodiments, an offer methodology from the reservation system 275 can couple all the customers 10 and attempt to create a transaction. Some embodiments include options or a price pause for service offerings. In some embodiments of the invention, service offerings or reservations can change in value over time, and fluctuate in price from the time of a booking or reservation to the actual consumption date or when the service is consumed. In the case of a hotel, a guest can make a reservation to stay for a future date, and can be presented with choices that can include a price for the future stay (e.g., where if the current day is May $20^{th}$, and the guest is searching for accommodations in New York City for July $10^{th}$ for two nights.) In some embodiments of the invention, the guest can be presented rates and a total price for the stay. In some embodiments, the hotel can also offer different cancellation and guarantee policies for the stay. For example, in some embodiments, just to guarantee a reservation, the guest can reserve at a price of $500. The hotel may offer an incentive to guests who pre-pay their reservation without the ability to cancel and offer a price for the same room at $400.

In some embodiments of the invention, the reservation system 275 can offer an option to the guest to reserve the price both in the case of a guaranteed reservation and in the case of a fully pre-paid reservation. In some embodiments, the amounts of the option or hold price fees can vary. For example, using the reservation system 275, the customer 10 may only have to pay a fraction of the cost to hold a price for a future service. For example, in some embodiments, the option or hold fees on the fully pre-paid reservation can be $25 and the option or hold fees on the guaranteed reservation may only be $1. In this case the guest is paying an option amount to hold the price. In either case the customer 10 is able to secure for a nominal price for a future service the current price offered. In some embodiments, the customer 10 can exercise the option to convert their option to the full reservation by paying the remaining amount at any time. This feature can be called price pause.

In some embodiments of the invention, a customer can price pause a number of hotels for a fee and decide which one they would like at a future date prior to the consummation of the service. In some embodiments, customers can 'freeze' the rate they see using one or more methods. For example, in some embodiments, a "price pause" method can be used where the customer can "hold" the rate for a period of time, with a cost defined by the holding period. In some embodiments, the customer would need to make a reservation prior to the expiration of the hold in order to take advantage of the rate being held. In another method, a customer would purchase an "option" on a reservation at a certain rate for some time in the future. The option can be exercised at any time prior to the arrival date. The option can also be sold in the marketplace without the customer ever having to make a reservation.

For example, in some embodiments, a first buyer can select the dates for which they intend to reserve and perform a search using the reservation system 275. While there is availability, there can be instances where the first buyer does not want to commit to purchasing the reservation at that time, however, they do like the pricing and would prefer to lock it. In case of a price pause, the first buyer can choose the timeframe for which they would like to keep the locked rate active. The reservation system 275 can provide a price that the first buyer must pay today to keep that rate locked. Prior to expiration of this time period, first buyer can purchase the reservation for the pre-determined price. If they allow the lock time period to expire they forfeit the hold price.

Alternatively, in some embodiments, the reservation system 275 can enable the first buyer an option to purchase the reservation at a pre-determined price. In some embodiments, based on the price chosen by the first buyer, an option can be priced by the reservation system 275. The option price is payable immediately, and the first buyer can then have an ability to convert the option into a reservation through the reservation start date by paying the pre-determined price. The user can also sell, swap, or buy the option on the reservation system 275 at any time.

Figure 3:
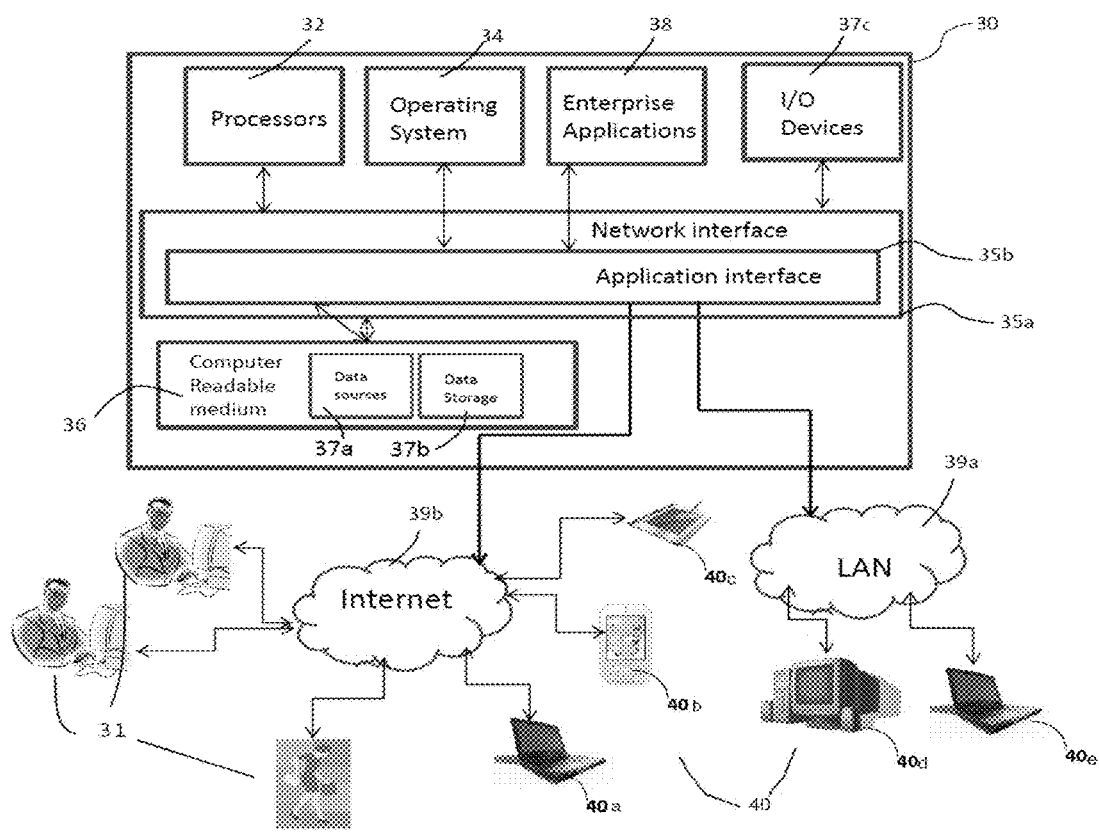
FIG. 3 shows one example of a system useful for performing one or more of the methods of the reservations system and method according to at least one embodiment of the invention.

In some embodiments, any one of the methods of the exchange as described earlier can be implemented using one or more computer systems. This can include instances where customers 10 buy directly from the reservations system and method, and/or where one or more sales channels buys directly from the reservations system and method, and/or where one or more service providers buys directly from the reservations system and method. Referring to FIG. 3, in some embodiments, a system 30 can perform one or more of the methods of the reservations system and method according to at least one embodiment of the invention. Further, in some embodiments, the reservations system and method can comprise one or more software modules implemented within a system architecture that is accessed by one or more computer systems owned or operated by a service provider or reseller. In this instance, transaction information can flow between the exchange systems residing on the service provider or reseller systems and the reservations system and method 200 operating as implemented in the example of FIG. 3. In some other embodiments, the reservations system and method can comprise one or more software modules implemented within a system architecture owned or operated by a service provider or reseller. In this instance, the reservations system and method modules can be configured to link and exchange reservation related information within the service provider or reseller systems to perform the exchange processes and functions as described earlier and shown in FIG. 2A.

In some embodiments, the computer system 30 can be configured for operating and processing components of the reservation system and method in accordance with some embodiments of the invention. In some embodiments, the computer system 30 can process one or more software modules of the aforementioned reservation system and method applications and display information related to reservation products and services within a graphical user interface. Some embodiments of the invention also include at least one graphical user interface. For example, in some embodiments, the system 30 implementation of FIG. 3 can be useful for performing at least one transaction using one or more of the methods of the reservations system and method described earlier, and displaying information related to the at least one transaction within a graphical user interface. In some embodiments, a user can review information displayed on the graphical user interface for use with a future transaction. In some other embodiments, a user can review information related to a current transaction (i.e., a transaction that is in progress). In some other embodiments, a user can review information related to one or more past transactions. In some embodiments, the reservations system and method can enable the display of information related to transactions of other users. For example, in some embodiments, the reservations system and method can enable the display of information related to individual transactions of other users and/or a representation of a compilation of past or current transactions (e.g., a trending view of transactions). Further, in some embodiments, the system framework of the reservation system and method 200 shown in FIG. 2A can use the computer system 30 to process one or more reservation system and method application services. The system framework can also manage the organization of data and data flow between the reservation system and method application services, the front end systems, and external (third party) computer systems.

In some embodiments, the system 30 can include at least one computing device, including one or more processors 32. Some processors 32 can include processors 32 residing in one or more conventional server platforms. The system 30 can include a network interface 35a and an application interface 35b coupled to at least one processor 32 capable of running at least one operating system 34. In some embodiments of the invention, the system 30 useful for processing one or more transaction can include processors residing in one or more conventional server platforms. For example, in some embodiments, the reservation system 275 can comprise at least one server of the system 30. In some embodiments of the invention, the software modules can include server-based software platform that can include numerous other software modules suitable for hosting at least one account and at least one client account, as well as transferring data between one or more accounts. For example, in some embodiments, the system 30 can include a network interface 35a and an application interface 35b coupled to at least one processors 32 capable of running one or more of the software modules (e.g., enterprise applications 38). In some embodiments, the software modules 38 can include server-based software platform that can include reservation software modules suitable for hosting at least one user account and at least one client account, as well as transferring data between one or more accounts.

With the above embodiments in mind, it should be understood that the invention can employ various computer-implemented operations involving reservation data stored in computer systems. Moreover, the above-described databases and models throughout the reservation can store analytical models and other data on computer-readable storage media within the system 30 and on computer-readable storage media coupled to the system 30. In addition, the above-described applications of the reservation system can be stored on computer-readable storage media within the system 30 and on computer-readable storage media coupled to the system 30. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated.

Some embodiments include the system 30 comprising at least one computer readable medium 36 coupled to at least one data storage device 37b, and/or at least one data source 37a, and/or at least one input/output device 37c. In some embodiments, the invention embodied by the reservation system can also be embodied as computer readable code on a computer readable medium 36. The computer readable medium 36 can be any data storage device that can store data, which can thereafter be read by a computer system (such as the system 30). Examples of the computer readable medium 36 can include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor (including processors 32).

In some embodiments of the invention, the computer readable medium 36 can also be distributed over a conventional computer network via the network interface 35a so that the reservation system embodied by the computer readable code can be stored and executed in a distributed fashion. For example, in some embodiments, one or more components of the system 30 can be tethered to send and/or receive data through a local area network ("LAN") 39a. In some further embodiments, one or more components of the system 30 can be tethered to send or receive data through an internet 39b (e.g., a wireless internet). In some embodiments, at least one software application 38 running on one or more processors 32 can be configured to be coupled for communication over a network 39a, 39b. In some embodiments, one or more components of the network 39a, 39b can include one or more resources for data storage, including any other form of computer readable media beyond the media 36 for storing information and including any form of computer readable media for communicating information from one electronic device to another electronic device.

In some embodiments, the network 39a, 39b can include wide area networks ("WAN"), direct connections (e.g., through a universal serial bus port) or other forms of computer-readable media 36, or any combination thereof. Further, in some embodiments, one or more components of the network 39a, 39b can include a number of client devices which can be personal computers 40 including for example desktop computers 40d, laptop computers 40a, 40e, digital assistants and/or personal digital assistants (shown as 40c), cellular phones or mobile phones or smart phones (shown as 40b), pagers, digital tablets, internet appliances, and other processor-based devices. In general, a client device can be any type of external or internal devices such as a mouse, a CD-ROM, DVD, a keyboard, a display, or other input or output devices 37c. In some embodiments, various other forms of computer-readable media 36 can transmit or carry instructions to a computer 40, including a router, private or public network, or other transmission device or channel, both wired and wireless. The software modules 38 can be configured to send and receive data from a database (e.g., from a computer readable medium 36 including data sources 37a and data storage 37b that can comprise a database), and data can be received by the software modules 38 from at least one other source. In some embodiments, at least one of the software modules 38 can be configured within the system to output data to at least one user 31 via at least one digital display (e.g., to a computer 40 comprising a digital display). In some embodiments, the user 31 can comprise at least one customer 10. In other embodiments, the user can comprise a service provider 210, and/or reselling agent 250.

In some embodiments, the system 30 as described can enable one or more users 31 to receive, analyze, input, modify, create and send data to and from the system 30, including to and from one or more enterprise applications 38 running on the system 30. Some embodiments include at least one user 31 coupled to a computer 40 accessing one or more modules of the reservation system including at least one enterprise application 38 via a stationary I/O device 37c through a LAN 39a. In some other embodiments, the system 30 can enable at least one user 31 (through computer 40) accessing enterprise applications 38 via a stationary or mobile I/O device 37c through an internet 39a.

In some embodiments, customers holding a reservation can solicit to 'swap' that reservation with an individual or entity holding a reservation at a different supplier or different destination. Each party is responsible for fulfilling payment on the reservation they acquire from the swap. There may be a cost charged by one or both parties to swap the reservation. For example, an individual who has a reservation for a hotel in Miami for a 4 night stay may swap that reservation with an individual who has a reservation for 3 nights in New York. The Miami party may charge $100 for the swap to take place. If the New York party accepts the swap offer, they are now responsible for fulfilling the payment of $100 to the other party and payment for the hotel in Miami, while the Miami party is responsible for the payment to the New York hotel.

Figure 4:
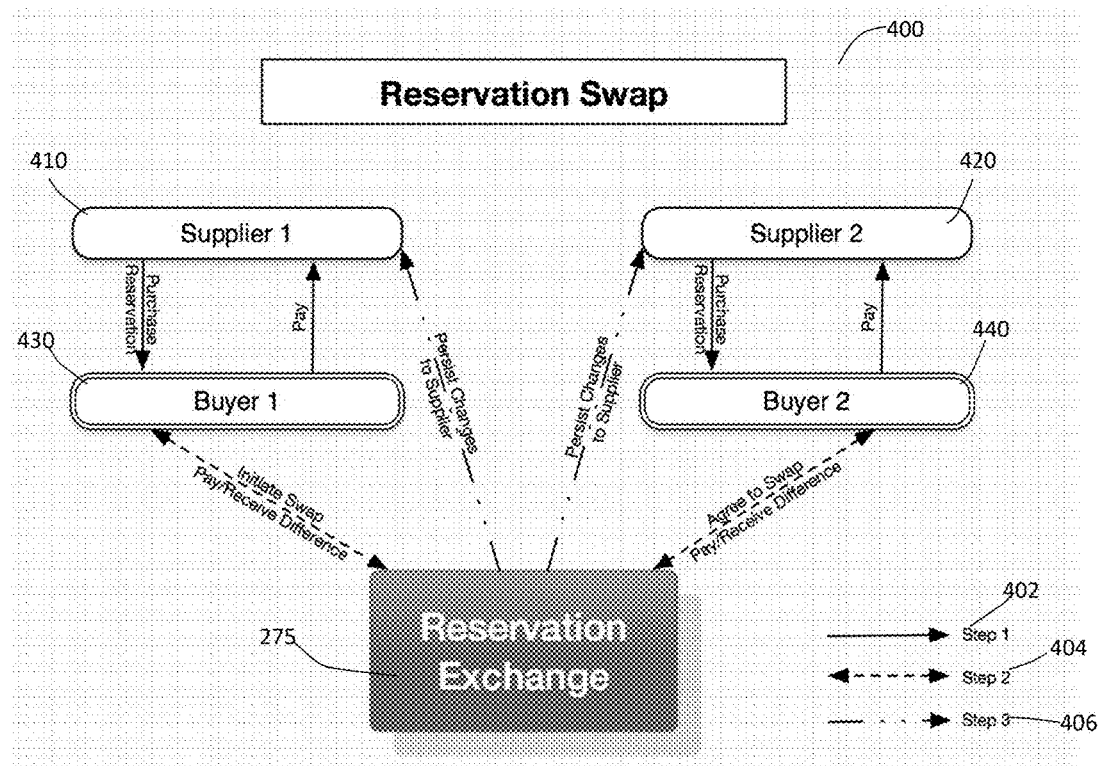
FIG. 4 illustrates a reservation swap process in accordance with some embodiments of the invention.

For example, FIG. 4 illustrates a reservation swap process 400 in accordance with some embodiments of the invention. In some embodiments, the reservation swap process 400 can comprise a series of transactions or steps including a first step 402, a second step 404, and/or a third step 406 between one or more suppliers, one or more buyers, and the reservation system 275. For example, some embodiments include a first supplier 410 and a first buyer 430. Some embodiments also include a second supplier 420 and a second buyer 440. In some embodiments of the invention, first and second buyers 430, 440 can independently acquire a reservation from the first and second suppliers 410, 420. In some embodiments, the first and second suppliers 410, 420 can be the same. In some embodiments, a second step can include the reservation system 275 enabling a reservation swap to occur between the first buyer 430 and the second buyer 440. In some embodiments, this can occur through several steps processed by the reservation system 275 including a step where the first buyer 430 and/or the second buyer 440 can list their reservations on reservation system 275 at a price they are willing to trade. Within another step, the first buyer 430 can initiates a swap for their reservation by sending a reservation swap offer to the second buyer 440 via reservation system 275. In some embodiments, another step can include the second buyer 440 agreeing to the swap and either receive or pay the difference between the listed price for the reservations being swapped. Further, the first buyer 430 and second buyer 440 can be provided with confirmations by the reservation system 27 for the successful swapping of reservations. In some embodiments, the seller may still have first buyer 430 listed as the holder of the reservation on their system. In some embodiments, the reservation system 275 can independently persist the ownership changes for both the first and second suppliers 410, 420. In some embodiments, the first and second suppliers 410, 420 can charge a transaction fee for the ownership change. They are not impacted by the secondary reservation swap transaction from an economic perspective as they have already received (prepaid) or will receive (at the time of usage) the price they had originally sold the reservation for. In some embodiments, this process can be repeated multiple times with reservations being swapped between multiple buyers.

In some embodiments of the invention, the reservation system 275 can actively solicit reservation holders to buy back the reservation. In some embodiments, through the reservation system 275, a service provider (e.g., for a hotel or indirect sales or distribution channel) can offer to buy back reservations or options that a customer holds. In some embodiments, they can solicit customers that hold a reservation below a certain rate and actively solicit a cancellation in exchange for a fee. In some embodiments, this can be managed through the reservation system 275 platform or through a 'White Label' solution where the reservation system 275 can provide the technology to another party. In some embodiments, this can be done in case the hotel overbooks a certain date, or an airline overbooks a certain flight, and wants to buy back some of the rooms or seats sold or reserved. In some embodiments, the service provider can also buy back the inventory to sell it for a higher price if they feel that the demand has risen. In some embodiments, through the reservation system 275, the service providers can reach the holders of the reservation either through the reservation system 275 platform, or through a white labeled solution that can sit on the service providers end.

Some embodiments of the invention can include a hot dates calendar, where the reservation system 275 can show future price elasticity of demand for a given market or given hotel. In some embodiments, the reservation system 275 can show where individual hotels or markets are underpriced for the future to allow customers to hedge on options or reservations for those dates. In some embodiments, this can also allow anyone holding a reservation, including group blocks, to determine the value of the inventory they hold before determining whether they want to cancel or sell the option or reservation.

Figure 5:
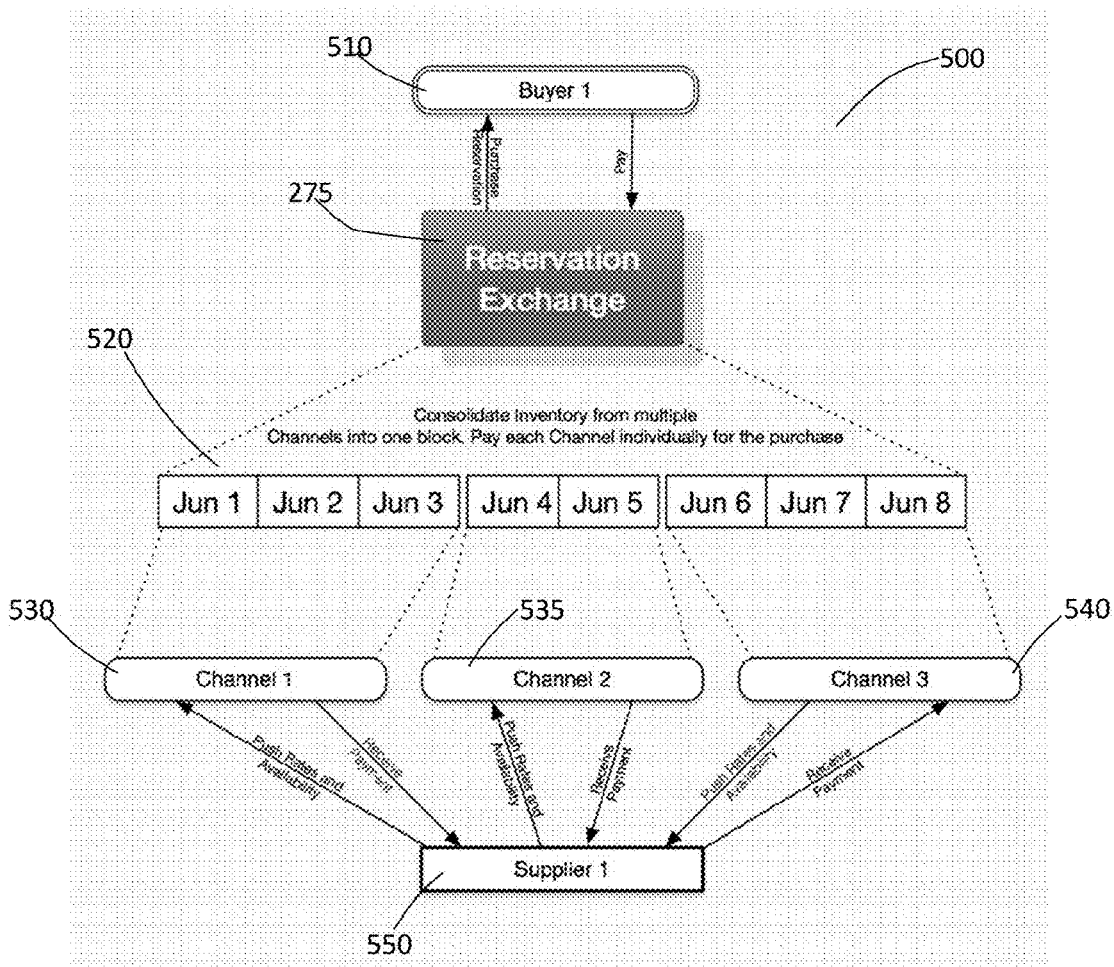
FIG. 5 illustrates a reservation process in accordance with some embodiments of the invention.

Some embodiments of the invention can accommodate a multi-channel inventory, and can facilitate pulling individual nights from multiple sellers to create a longer stay. In some embodiments, this can enable the reservation system 275 to create a multiple night stay using single, or multiple nights, from multiple sources. For example, a first night may be from a first source because it's the cheapest for that night, while the second and third nights may come from a second source, and a fourth night may originate from a third source. Therefore, in this example embodiment, a four-night reservation would be formed from three separate reservations from three separate sources, processed using the reservation system 275 so as to be seamless to the customer. For example, referring to FIG. 5 illustrating a reservation process 500, some embodiments include a first buyer 510 using the reservation system 275 to select and purchase at least one reservation covering a reservation period 520. In some embodiments, a supplier 550 can couple to the reservation system 275 using at least one channel. For example, some embodiments include a first channel 530, and/or a second channel 540, and/or a third channel 550. In some embodiments, the first buyer 430 can search for availability on their chosen dates using reservation system 275. In some embodiments, the reservation system 275 can algorithmically determine that the prices offered for the entire search period by any one channel is potentially higher than a combination of distinct searches across multiple channels that when combined, can include all dates in the search period. In some embodiments, the reservation system 275 can then add this multi-channel search result to the other single-channel search results, and present the same to first buyer 430 in a consolidated manner. In some embodiments, the first buyer 430 can choose the multi-channel search from the search results and pay the price shown by reservation system 275. Further, in some embodiments, the reservation system 275 can then individually confirm each segment of the search period with the individual channel that was included in the original consolidated search result. In some embodiments, the payment from first buyer 430 is split and sent to each individual channel, and the confirmations from each channel (530, 535, 540) can be recorded by the reservation system 275, and then turned into one unique confirmation number that is provided to first buyer 430.

Figure 6:
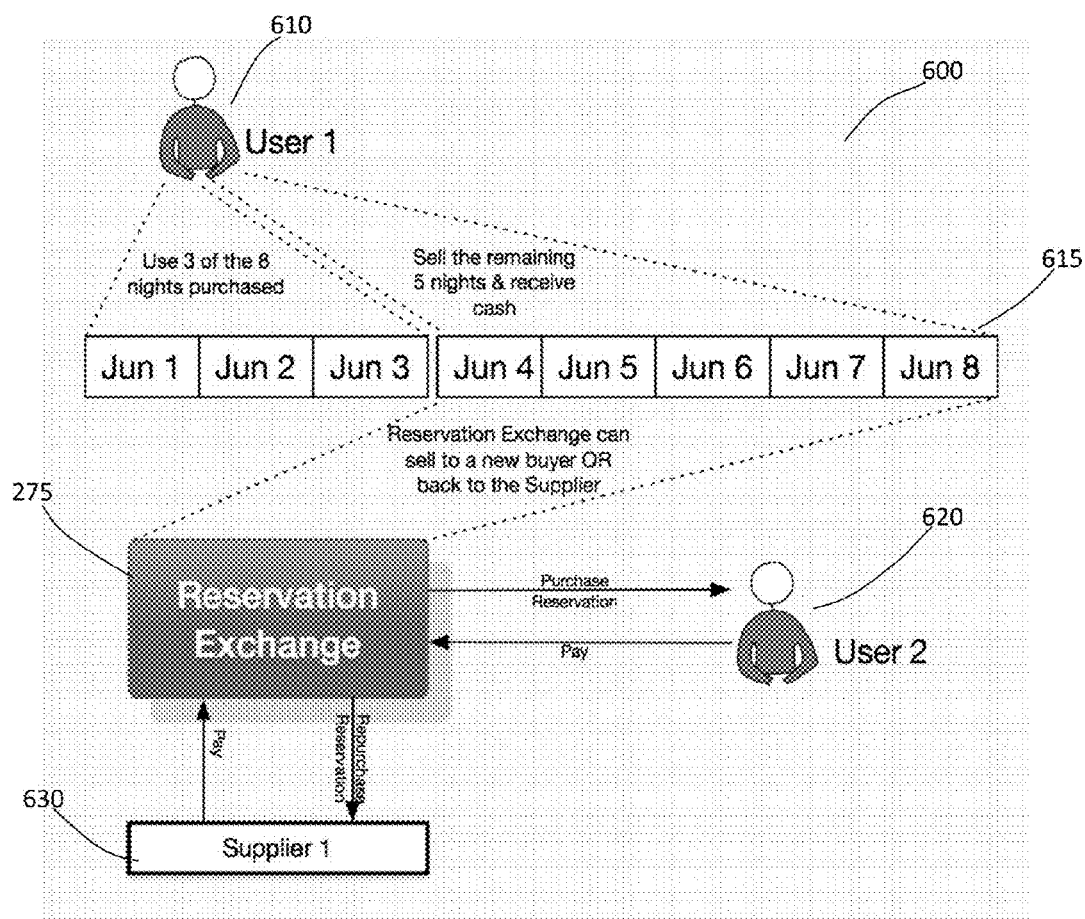
FIG. 6 illustrates a reservation process in accordance with some embodiments of the invention.

Some further embodiments of the invention can accommodate a master reservation & stay break. For example, in some embodiments, the reservation system 275 can enable an individual or group of individuals to make a reservation for stays longer thirty days and up to a year or more in length. This inventory can then be sold on the reservation system 275 for any period in the future if not used by the 'lease holder'. This option can offer a total rate for the entire period, and can allow for financing terms where applicable. For example, an individual customer may decide to buy from the service provider a year's worth of inventory for one room for 365 nights. The customer may then decide to split that into 365 units and sell it to a number of individual customers. The sale may happen at different points in time prior to the actual consumption of the service. Further, this option can allow a customer to sell a portion of their reservation to another customer or any other party, including back to the original supplier or third party. For example, FIG. 6 illustrates a reservation process 600 including a first user 610 coupled to a second user 620 using the reservation system 275 for transacting a reservation from a supplier 630 and exchanging of at least a portion of the reservation over a reservation period 615. In some instances, the first user 610, who is the existing owner of the reservation for a contiguous block of dates (reservation period 615), may decide to use only a portion of the dates, and can list the remaining dates for sale on the reservation system 275. In some embodiments, a second user 620 who is a buyer on the reservation system 275, can search and select unused dates listed for sale by the first user 610, and pay the price sought by the first user 610 through the reservation system 275. In some embodiments, the reservation system 275 can forward the payment to the first user 610 while also ensuring that the name change on the reservation is persisted to the supplier 630. Alternatively, in some embodiments, the supplier 630 who sold the original reservation to the first user 610 can be enabled by the reservation system 275 to repurchase the listed unused dates as they may have oversold on those dates. In some embodiments, the reservation system 275 can forward the payment to the supplier 630, and a name change can be performed if it is required by the supplier 630.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A reservation system for managing transactions within an online marketplace comprising:
   a reservation server configured and arranged to mediate and control inventory exchange from at least one buyer to at least one seller via at least one online network of an online marketplace,
   the reservation server comprising at least one memory coupled to at least one processor coupled to the online network, the at least one memory including computer-executable instructions that when executed by the at least one processor establishes at least one sales channel between the at least one seller and the at least one buyer,
   the at least one sales channel comprising at least one direct sales channel, at least one indirect sales channel, and at least one resale channel; and wherein the at least one online network comprises at least one marketplace server including at least one good and/or service that can be reserved, sold, resold, purchased, repurchased, or swapped through the at least one sales channel mediated by the reservation server based at least in part on the reservation server receiving at least one good and/or service reservation request from the at least one seller or the at least one buyer, the at least one good and/or service comprising a set price from the at least one seller or the at least one buyer; and wherein the reservation server is configured to control an exchange of transaction data between the reservation server and the marketplace server that actively solicits a buy-back of at least one previously sold good and/or service, and wherein the reservation server is configured to enable at least one buyer to control an exchange of transaction data between the reservation server and the marketplace server that facilitates an exchange of at least a portion of the at least one previously sold good and/or service previously purchased through the reservation server with another buyer as resold good and/or service, calculates a payment for the resold good and/or service, and forwards payment for the resold good and/or service to the at least one buyer and facilitate an identity change for the resold good and/or service; and at least one graphical user interface configurable by the reservation server to:
  display information related to the transaction data so that a seller receives a consolidated view of all offers that are received for their good and/or service from the reservation system, and
  display information related to stored transactions of other users and a compilation of past or current stored transactions as a trending view of past and ongoing transactions, and
  wherein the reservation server is configured to enable a transaction to take place at a different price from a visible or displayed retail price of an offer with the transaction occurring substantially instantly based on the buyer accepting the seller's listed price; and
  wherein the at least one memory includes computer-executable instructions that when executed by the at least one processor manage transaction data to and from the reservation server that controls a swap or repurchase of at least one good and/or service, or controls an option to swap or repurchase the at least one good and/or service between sellers and buyers, the management of transaction data including configuring ownership change of a swapped or repurchased good and/or service, and
  processing a change fee collection data transfer between the reservation server and a supplier server to control transfer of change fees to an original supplier of the at least one good and/or service from one or more sellers or buyers, and
  processing a proceeds data transfer from the reservation server comprising controlling a collection and distribution of proceeds based on a swap or repurchase price difference between a swapped or repurchased good and/or service or an option to swap or repurchase the at least one good and/or service at a pre-determined price.

2. The reservation system of claim 1, wherein the at least one seller or buyer comprises a service provider or supplier coupled to the online marketplace via the online network.

3. The reservation system of claim 1, wherein the at least one sales channel comprises a bidirectional sales channel configured to enable a transfer of the at least one good and/or service from the at least one seller and the at least one buyer and from the at least one buyer to the at least one seller.

4. The reservation system of claim 1, wherein the reservation server is configured and arranged to enable at least one buyer to reserve the right to purchase the at least one good and/or service at a future date for a specified amount.

5. The reservation system of claim 1, wherein the reservation server is configured and arranged to enable at least one buyer to at least partially pre-pay for the at least one good and/or service.

6. The reservation system of claim 1, wherein the at least one good and/or service comprises at least one of an accommodation reservation, a food or food service reservation, a cruise reservation, a flight reservation, a golf tee time reservation, a sports event reservation, a concert reservation, and a rental vehicle reservation.

7. The reservation system of claim 1, wherein the at least one good and/or service is sourced from the online marketplace by the at least one buyer through a plurality of sales channels including the at least one direct sales channel and the at least one indirect sales channel and the at least one resale channel.

8. The reservation system of claim 7, wherein the at least one online network includes at least one buyer, and the at least one good and/or service was previously reserved or sold through the reservation server by at least one other buyer.

9. The reservation system of claim 1, wherein the reservation server is configured and arranged to sell the at least one good and/or service with a lowest set price.

10. The reservation system of claim 9, wherein the reservation server is configured and arranged to specify the at least one sales channel as the at least one direct sales channel, the at least one indirect sales channel, or the at least one resale channel based on a price of the at least one good and/or service,
  the price of the at least one good and/or service comprising at least one of an intrinsic market value at the time of sale, a lowest price calculated by the reservation server based on prices received by the reservation server through the at least one sales channel, a sellers set price, and a buyers bid price.

11. The reservation system of claim 1, wherein the reservation server is configured and arranged to receive at least one bid through the at least one online network for at least one good and/or service from at least one buyer and direct the at least one bid through at least one sales channel within the at least one online network to at least one seller.

12. The reservation system of claim 11, wherein the reservation server is configured and arranged to enable at least one good and/or service transaction from the at least one marketplace server when the at least one bid is different than the at least one sellers set price.

13. The reservation system of claim 11, wherein the reservation server is configured and arranged to enable a good and/or service transaction from the at least one marketplace server when the at least one bid is lower than the at least one sellers set price.

14. The reservation system of claim 11, wherein the reservation server is configured and arranged to enable a good and/or service transaction from the at least one marketplace server when the at least one bid is lower than a current intrinsic market value of the at least one good and/or service at the time of sale.

15. The reservation system of claim 11, wherein the reservation server is further configured and arranged to enable the at least one buyer to exercise the bid for at least one current or future good and/or service transaction.

16. The reservation system of claim 11, wherein the reservation server is configured and arranged to accept at least one bid from at least one buyer when there is no good and/or service available.

17. The reservation system of claim 11, wherein the reservation server is configured and arranged to enable the at least one buyer or the at least one seller to specify the at least one sales channel as the at least one direct sales channel, the at least one indirect sales channel, or the at least one resale channel.

18. The reservation system of claim 11, wherein the at least one seller comprises a service provider or supplier coupled to the online marketplace via the online network.

19. The reservation system of claim 11, wherein the at least one seller comprises another buyer coupled to the online marketplace via the online network.

20. The reservation system of claim 1, wherein the at least one seller comprises an individual communicatively coupled to the at least one online network.

21. The reservation system of claim 1, wherein the at least one seller comprises the at least one marketplace server.

22. The reservation system of claim 1, wherein the reservation server is configured and arranged to enable the at least one buyer to pause or freeze at least one price for the at least one good and/or service for a specified period of time, the at least one price calculated by the reservation server based at least in part on the period of time.

23. The reservation system of claim 1, wherein the reservation server is configured and arranged to enable the at least one buyer to purchase at least one option to purchase for at least one pre-determined price for the at least one good and/or service for a lock period; and wherein prior to expiration of the lock period, the at least one buyer can purchase the at least one reservation for the at least one pre-determined price; and wherein the reservation server is configured and arranged to sell unused options through the online marketplace.

24. The reservation system of claim 1, wherein the reservation server is configured and arranged to solicit for and purchase at least one good and/or service through the online marketplace via the at least one online network, wherein purchase is driven by demand-driven inventory value opportunities enabling the reservation server to later sell the at least one good and/or service at a lower price than the original purchase price or the current market price.

25. The reservation system of claim 1, wherein the at least one good and/or service can be sourced from more than one seller; and wherein the reservation server is configured and arranged to enable the buyer to purchase the at least one good and/or service from one or more sellers based on a final price calculated by the reservation server from one or more prices received from the one or more sellers.

* * * * *